United States Patent [19]

Stine

[11] Patent Number: 5,120,083
[45] Date of Patent: Jun. 9, 1992

[54] EXPANSION JOINT FOR CONDUIT FOR CABLES

[75] Inventor: Herman L. Stine, Dillsburg, Pa.

[73] Assignee: Henkels & McCoy, Inc., Blue Bell, Pa.

[21] Appl. No.: 495,655

[22] Filed: Mar. 19, 1990

[51] Int. Cl.$^5$ ............................................. F16L 21/00
[52] U.S. Cl. .................... 285/31; 285/302; 285/419
[58] Field of Search ............... 285/302, 15, 31, 119, 285/298, 419, 373, 176

[56] References Cited

U.S. PATENT DOCUMENTS

| | | | |
|---|---|---|---|
| 1,357,564 | 11/1920 | Hughes | 285/302 X |
| 1,580,325 | 4/1926 | Perry | 285/302 |
| 1,987,372 | 1/1935 | Schellhammer | 285/302 |
| 3,084,869 | 4/1963 | Hutty et al. | 285/302 X |
| 3,451,483 | 6/1969 | Van Houtte et al. | 285/302 X |
| 4,223,702 | 9/1980 | Cook | 285/302 X |
| 4,284,298 | 8/1981 | Kaufmann, Jr. | 285/302 |
| 4,558,893 | 12/1985 | Shelly | 285/176 X |
| 4,861,942 | 8/1989 | Moran, Jr. | 285/302 X |

Primary Examiner—Dave W. Arola
Assistant Examiner—Heather Chun
Attorney, Agent, or Firm—Caesar, Rivise, Bernstein, Cohen & Pokotilow, Ltd.

[57] ABSTRACT

An expansion coupling and method of use for joining the ends of a pair of first and second conduits along a longitudinal axis. Each of the conduits is a tubular member of circular cross-section having an outside threaded leading end and an outside threaded trailing end. The coupling comprises an inner and outer sleeve. Both sleeves are elongated tubular members having a first end in the form of an internally threaded throat adapted to threadedly receive a respective threaded end of a respective conduit. The inner sleeve has a second end of a square outer periphery. The outer sleeve also has a second end of a square outer periphery. The second end of the inner sleeve is arranged for disposition within the second end of the outer sleeve to readily slide with respect thereto along the longitudinal axis, with the contiguous surfaces of the second ends of both sleeves preventing the rotation of the sleeves with respect to each other about the longitudinal axis.

17 Claims, 3 Drawing Sheets

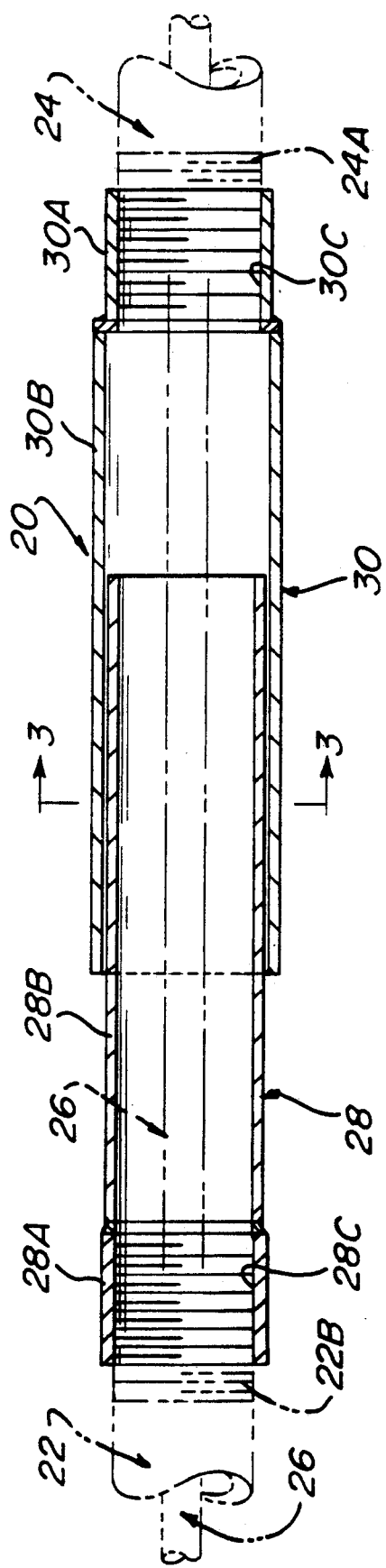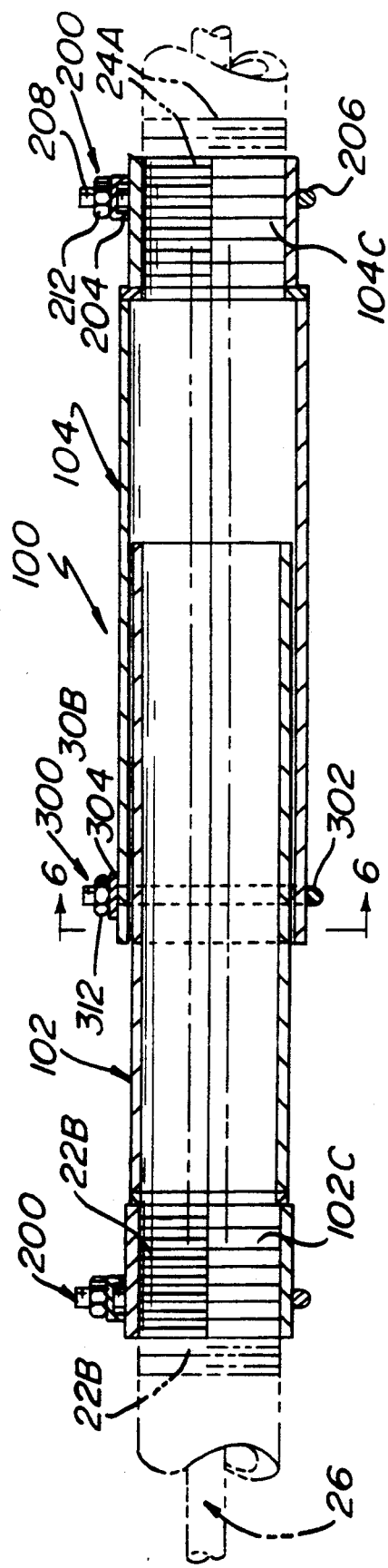

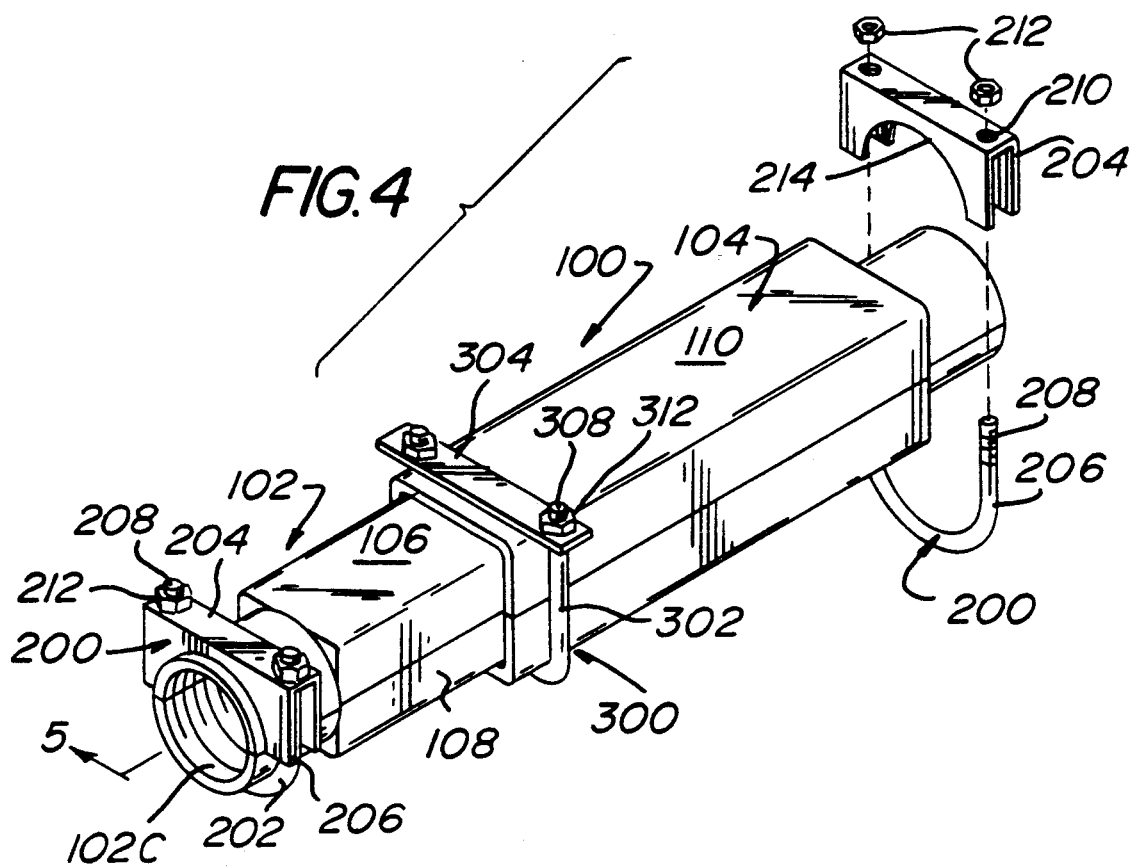
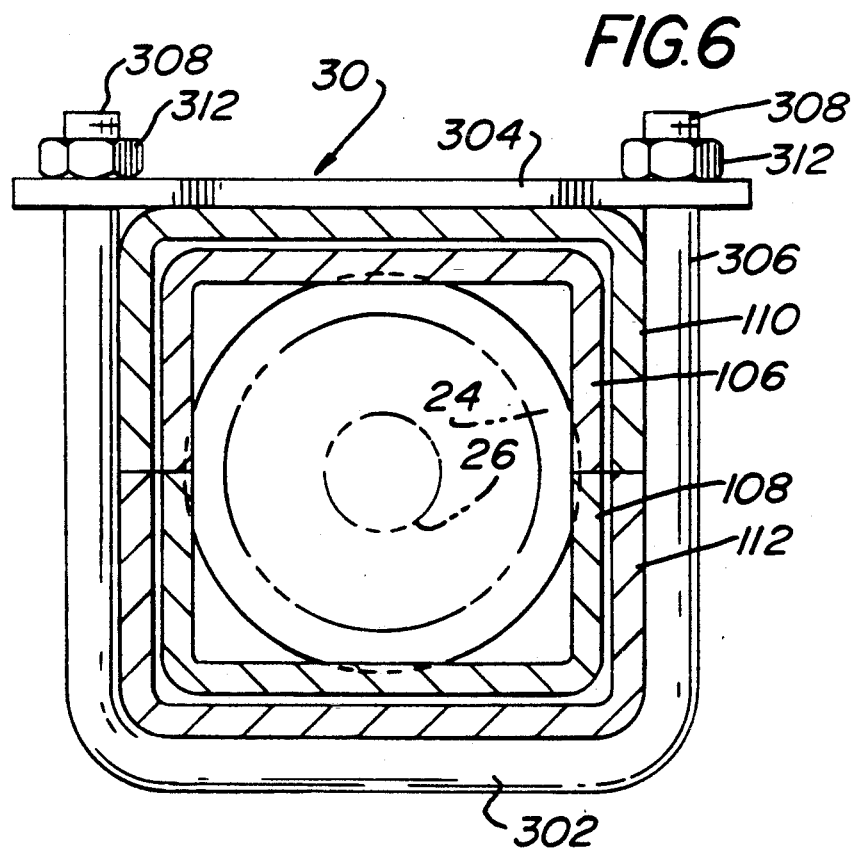

EXPANSION JOINT FOR CONDUIT FOR CABLES

BACKGROUND OF THE INVENTION

This invention relates generally to expansion joints and more particularly to expansion joints for conduits carrying cables. Basically the invention comprises an expansion joint which is used to connect adjacent ends of conduits carrying cables, such as fiber optic cables.

In the prior art conduits for carrying cables, e.g., fiber optic, electrical, etc., have been connected by an expansion joint (coupling) to accommodate changing temperatures. Such expansion joints basically comprise two members, namely a collar and a cap, which are threadedly secured together. The collar is a cylindrical member having one end at which there is disposed a female threaded opening. That threaded opening is arranged to receive the trailing end of one conduit, e.g., a leading conduit. The cap is threadedly secured onto the collar and includes a smooth, i.e., non-threaded, opening for receiving the leading end of the next, e.g., trailing, conduit. Since the leading end of the trailing conduit is not threadedly engaged by any portion of the coupling it can thus slide longitudinally through the opening in the coupling's cap.

It has been found that when such couplings are used in application wherein the conduits are supported above the ground, e.g., where they cross bridges, overpasses, etc., the conduits have a tendency to become disconnected. Such disconnections typically result from vibrations which are transmitted to the structure supporting the conduits and expansion joint coupling. In particular, where the conduits are supported by rollers or some other means to enable the conduits to move longitudinally, loosening, if not total disconnection, commonly occurs. In this regard since the trailing conduit can slide longitudinally within the cap of the coupling (it is not threaded in that cap) it is free to rotate about its longitudinal axis, whereupon it may become unthreaded from the threaded collar of the trailing coupling.

OBJECTS OF THE INVENTION

Accordingly, it is a general object of this invention to provide a coupling forming an expansion joint for conduits which overcomes the disadvantages of the prior art.

It is a further object of this invention to provide a coupling forming an expansion joint for conduits which can be used for new construction to connect conduits together so that a cable may extend therethrough.

It is still a further object of this invention to provide a coupling forming an expansion joint to retrofit prior art couplings for existing cable systems.

It is yet a further object of this invention to provide a coupling forming an expansion joint for conduits which is simple in construction, relatively low in cost, and effective in operation.

SUMMARY OF THE INVENTION

These and other objects of this invention are achieved by providing an expansion coupling and method of use for joining the ends of a pair of first and second conduits along a longitudinal axis. Each of the conduits is a tubular member of circular cross-section having an outside threaded leading end and an outside threaded trailing end. The coupling comprises inner sleeve means and outer sleeve means. The inner sleeve means is an elongated tubular member having a first end in the form of an internally threaded throat adapted to threadedly receive the trailing end of the first conduit. The outer sleeve means is an elongated tubular member having a first end in the form of an internally threaded throat adapted to threadedly receive the leading end of the second conduit. The inner sleeve means has a second end of a predetermined shaped outer periphery having at least one first predetermined shape, e.g., flat, surface. The outer sleeve means has a second end of a predetermined shaped inner periphery having at least one second predetermined shape, e.g., flat, surface. The second end of the inner sleeve means is arranged for disposition within the second end of the outer sleeve means and with their respective first and second surfaces contiguous with each other. The inner and outer sleeve means are arranged to readily slide with respect to each other along the longitudinal axis, with the contiguous first and second surfaces preventing the rotation of the inner sleeve means with respect to the outer sleeve means about the longitudinal axis.

DESCRIPTION OF THE DRAWINGS

Other objects and many attendant features of this invention will become readily appreciated as the same becomes better understood by reference to the following detailed description when considered in connection with the accompanying drawings wherein:

FIG. 2 is an enlarged sectional view taken along line 2—2 of FIG. 1;

FIG. 4 is an isometric view of another embodiment of an expansion joint coupling constructed in accordance with this invention;

FIG. 5 is an enlarged sectional view taken along line 5—5 of FIG. 5; and

FIG. 6 is an enlarged sectional view taken along line 6—6 of FIG. 5.

DETAILED DESCRIPTION OF THE PREFERRED EMBODIMENTS

Figure 1:
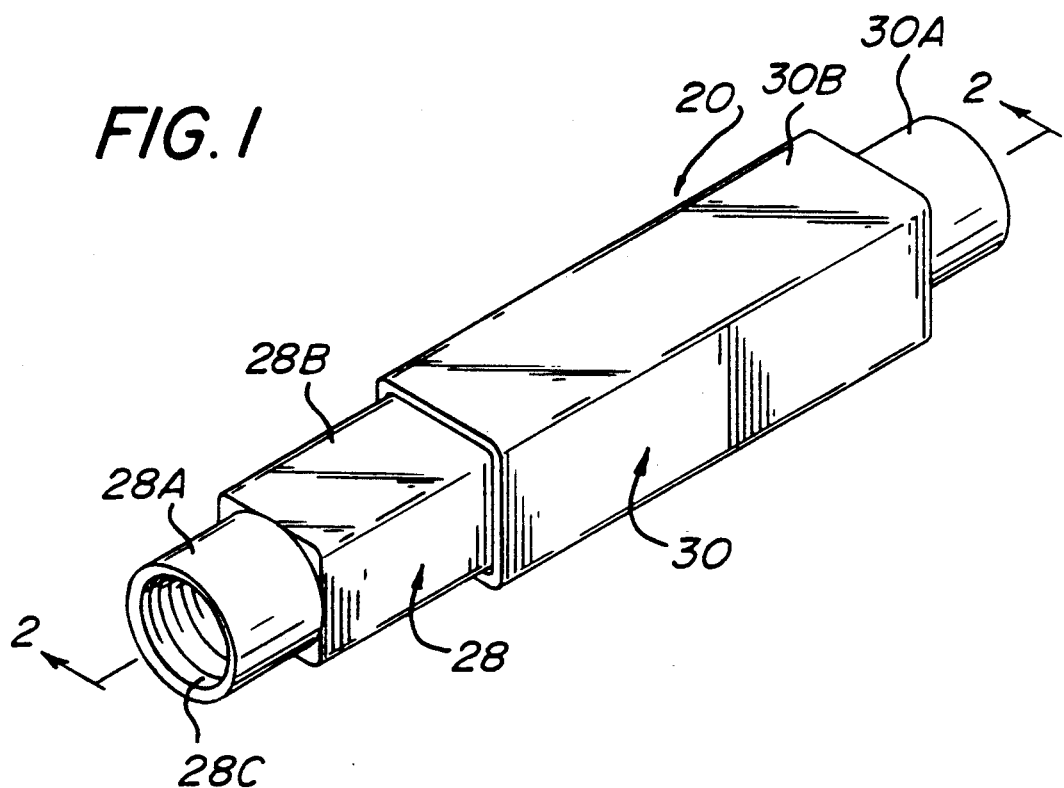
FIG. 1 is an isometric view of one embodiment of an expansion joint coupling constructed in accordance with this invention.

Referring now to various figures of the drawing where like reference numerals refer to like parts there is shown at 20 in FIG. 1 an expansion coupling constructed in accordance with this invention. The coupling 20 is arranged for new construction, that is to connect the ends of a pair of conduits 22 and 24 (FIG. 2) before a cable 26 (FIG. 2) is extended therethrough. In FIGS. 4–6 there is shown another embodiment of a coupling 100 constructed in accordance with this invention. The coupling 100 is arranged for use in existing cable systems to replace prior art expansion couplings without requiring the disconnection of or interfering with the cable(s) extending therethrough. The details of coupling 100 will be described later.

Figure 3:
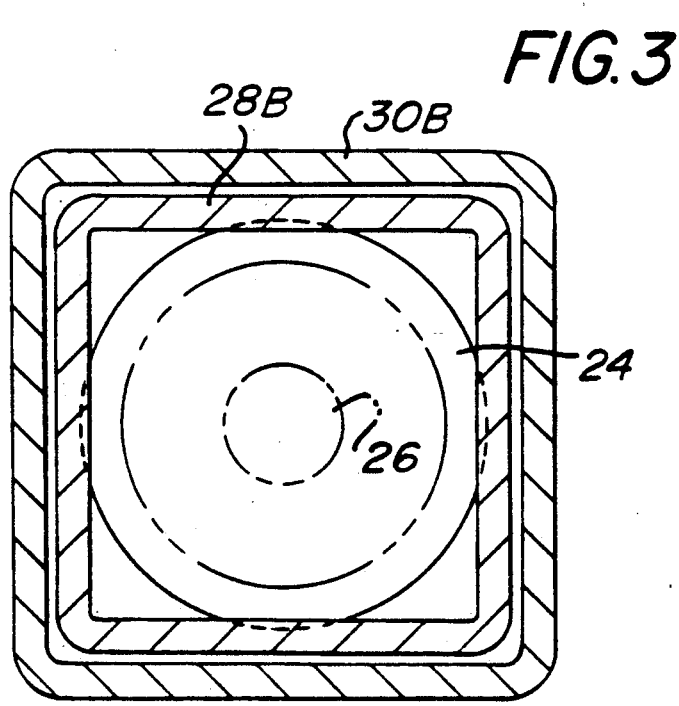
FIG. 3 is an enlarged sectional view taken along line 3—3 of FIG. 2.

As can be seen in FIGS. 1–3 the coupling 20 basically comprises two sleeve members 28 and 30. Each of the members is an elongated tube having one end of circular cross-section and another end of square cross-section. In particular, the sleeve member 28, hereinafter referred to as the inner sleeve member, has a circular cross-sectional end 28A and a square cross-sectional end 28B. Similarly, the sleeve member 30, hereinafter referred to as the outer sleeve member, has a circular cross-sectional end 30A and a square cross-sectional end 30B.

The interior or throat of the free end 28A of the inner sleeve 28 is threaded at 28C to provide means for connecting the trailing end 22B of the conduit 22 to it. Thus, as can be seen in FIG. 2 the conduit's trailing end 22B is externally threaded with threads to mate with the internal threads 28C of the inner sleeve 28. In a similar manner the interior or throat of the free end 30A of the outer sleeve 30 is threaded at 30C to provide means for connecting the leading end 24A of the conduit 24 to it. That conduit's leading end 24A is externally threaded with threads to mate with the internal threads 30C of the outer sleeve 30.

In accordance with the teachings of this invention the inner sleeve is arranged to be coupled to the outer sleeve to connect the conduit to each other and with the sleeves being freely slidable with respect to each other to take up any expansion or contraction of the connected conduits 22 and 24. To that end the square cross-section portion 28B of the inner sleeve is configured to closely fit within the outer sleeve portion 30B so that the two members 28 and 30 can slide with respect to each other along their longitudinal, central axis.

As will be appreciated by those skilled in the art inasmuch as the engaging portions 28B and 30B are each of square cross section each includes one flat surface disposed contiguous with the other. Thus, the two sleeves 28 and 30 cannot rotate about the longitudinal axis of the coupling. Accordingly the conduits 22 and 24 when connected (screwed) to their respective coupling sleeves are unable to rotate about their longitudinal axis and cannot become disconnected (unscrewed). The resulting joint, however, can expand or contract (as the case may be) by the longitudinal sliding of the inner sleeve 28 with respect to the outer sleeve 30.

In one exemplary embodiment this invention for use with two inch (5.1 cm) GIP conduits, each of the sleeves 28 and 30 is fourteen inches (35.6 cm) long, with their circular cross-sectional portions being two inches (5.1 cm) long. The outer sleeve portion 30B is three inches (7.6 cm) in width and height, while the inner sleeve portion 28B is two and a half inches (6.4 cm) in width and height. The space provided inside of the foregoing sized coupling 2 allows for at least eight inches of longitudinal expansion, but such an arrangement is merely exemplary. Thus, other couplers constructed in accordance with this invention can be designed to accommodate other longitudinal expansions. Also, it should be understood that couplers in accordance with this invention can be designed to accommodate conduits of various diameters.

It must be pointed out at this juncture that the engaging portions 28B and 30B of the sleeves 28 and 30, respectively, need not be of square cross section so long as they each include one flat surface to prevent relative rotation with respect to each other about their longitudinal central axis.

In the retrofit embodiment the coupling 100 is made up of an inner sleeve 102 and an outer sleeve 104. The sleeves 102 and 104 are basically constructed in the same manner as described heretofore with reference to sleeves 28 and 30, except that each sleeve is bisected (split) horizontally so that each includes an upper section and a lower section, which are arranged to be clamped together. Thus, the inner sleeve 102 comprises an upper section 106 and an lower section 108, while the outer sleeve 104 comprises an upper section 110 and a lower section 112. When the upper section 106 of the inner sleeve 102 is disposed over its lower section 108 the resulting body is virtually identical to the inner sleeve 28 described heretofore. So too, when the upper section 110 of the outer sleeve 104 is disposed over its lower section 112 the resulting body is virtually identical to the inner sleeve 30 described heretofore. Hence the common structural features of the sleeves will not be reiterated hereinafter.

The securement of the inner sleeve sections 106 and 108 is accomplished by the use of a clamp 200. The clamp 200 basically comprises a U-shaped member 202 and a yoke member 204. The member 202 has a pair of legs 206 each terminating in a respective threaded end 208. Each leg is arranged to extend through a respective opening 210 in the yoke member 204. The yoke member 204 includes a curved surface 214 whose radius is the same as that of the circular cross sectional portion of the sleeve 102. Once the legs 206 are extended through the openings 210 respective nuts 212 are screwed onto the respective threads 208 on the legs to hold the yoke member 204 in place on the U-shaped member 202. The circular cross-sectional portion of the inner sleeve 102 is disposed within the space between the U-shaped member and the curved surface 214 of the yoke member 204, and the nuts are tightened to firmly secure the sections 106 and 108 together.

The circular cross-sectional portion of the outer sleeve 104 is secured together in the same manner by use of another clamp 200.

The square cross-sectional portions of the two sections 110 and 112 of the outer sleeve 104 are secured together by use of another type of clamp 300. As can be seen in FIG. 6 the clamp 300 basically comprises a U-shaped member 300 and an linear bridging member 302. The member 302 has a pair of legs 306 each terminating in a respective threaded end 308. Each leg is arranged to extend through a respective opening 310 in the bridging member 304. Once the legs are extended through those openings respective nuts 312 are screwed onto the respective threads 308 on the legs 306 to hold the bridging member 304 in place on the U-shaped member 302. The square cross-sectional portion of the outer sleeve 104 is disposed within the square space between the U-shaped member 302 and the bridging member 304, and the nuts are tightened to firmly secure the sections 110 and 112 together.

The retrofit coupling 100 is used as follows: the existing (e.g., prior art) coupling (not shown) serving to connect the two conduits 22 and 24 is cut off or otherwise removed from the two adjacent ends 24A and 22B without disconnecting or interfering with the cable 26 passing therethrough. This action exposes the adjacent threaded ends of the two conduits. The lower section 108 of the inner sleeve 102 is then disposed under the leading conduit 22 so that its threads 102C receive the threads 22B of the conduit 22. In a similar manner the lower section 112 of the outer sleeve 104 is positioned under the conduit 24 and with respect to section 108 so that its threads 104C receive the threads 24A end of the trailing conduit 24. The upper section 106 of the inner sleeve 102 is then put in place in the same manner as the lower section 108 of that sleeve and the upper section 110 of the outer sleeve 104 is then put in place of the same manner as the lower section 112 of the outer sleeve. The upper and lower sections of the inner sleeve 102 are then clamped together by the clamp 200 extending about the circular end of that sleeve. Another clamp 200 clamps the circular end of two sections of the outer sleeve, while the intermediate clamp 300 is placed about the square section of the outer sleeve to complete the assembly.

Without further elaboration the foregoing will so fully illustrate my invention that others may, by applying current or future knowledge, adopt the same for use under various conditions of service.

I claim:

1. An expansion coupling having a longitudinal axis and arranged for slidably connecting the ends of a pair of first and second conduits along said axis, each of said conduits being a tubular member having an outside threaded leading end and an outside threaded trailing end, said coupling comprising inner sleeve means and outer sleeve means, said inner sleeve means comprising a tubular member terminating in a first free end and a second free end, said first free end being in the form of an internally threaded throat adapted to threadedly receive the trailing end of said first conduit, said outer sleeve means comprising a tubular member terminating in a first free end and a second free end, said first free end being in the form of an internally threaded throat adapted to threadedly receive the leading end of said second conduit, said inner sleeve means being of a first predetermined constant shaped outer profile along a substantial length thereof up to and including said second free end of said inner sleeve means, said first predetermined shaped outer profile having at least one first predetermined shaped surface, said outer sleeve means being of a second predetermined constant shaped inner profile along a substantial length thereof up to and including said second free end of said outer sleeve means, said second predetermined constant shaped inner profile corresponding in shape to said first predetermined constant shaped outer profile and having at least one second predetermined shaped surface, said second free end of said inner sleeve means being arranged for disposition within said second free end of said outer sleeve means and with said first and second predetermined constant shaped surfaces contiguous with each other, said inner and outer sleeve means once so disposed being arranged to readily and freely slide with respect to each other along said longitudinal axis, with said first and second predetermined constant shaped surfaces engaging each other at points therealong to prevent the rotation of said inner sleeve means with respect to said outer sleeve means about said longitudinal axis as said inner and outer sleeve means slide with respect to each other, whereupon said coupling enables said conduits to freely move longitudinally with respect to each other in response to changes in the environment in which said conduits are located without resulting in the disconnection of said conduits from each other.

2. The coupling of claim 1 wherein said second free end of said inner sleeve means has a square outer profile, and wherein said second free end of said outer sleeve means has a square inner profile.

3. The coupling of claim 2 wherein said first free end of said inner sleeve means and said outer sleeve means each has a circular outer profile.

4. An expansion coupling having a longitudinal axis and arranged for slideably connecting the ends of a pair of first and second conduits along said axis, each of said conduits being a tubular member having an outside threaded leading end and an outside threaded trailing end, said coupling comprising inner sleeve means and outer sleeve means, said inner sleeve means being a tubular member having a first end in the form of an internally threaded throat adapted to threadedly receive the trailing end of said first conduit, said outer sleeve means being a tubular member having a first end in the form of an internally threaded throat adapted to threadedly receive the leading end of said second conduit, said inner sleeve means having a free end in the form of a second end of a predetermined shaped outer periphery having at least one first predetermined shaped surface, said outer sleeve means having a free end in the form of a second end having an opening corresponding in shape to the outer periphery of the free end of said inner sleeve, said second end of said inner sleeve means having a square outer profile, said second end of said outer sleeve means having a square inner profile, said first end of said inner sleeve means and said outer sleeve means each having a circular outer profile, said second end of said inner sleeve means being arranged for disposition within said second end of said outer sleeve means and with said first and second surfaces contiguous with each other, said inner sleeve means being bisected horizontally to comprise a lower section and an upper section, said outer sleeve means being bisected horizontally to comprise a lower section and an upper section, said upper and lower sections of each of said sleeve means being arranged to be secured to each other via first and second clamp means for securing said lower and upper sections together, said inner and outer sleeve means once so disposed being arranged to readily and freely slide with respect to each other along said longitudinal axis, with said first and second surfaces being contiguous to prevent the rotation of said inner sleeve means with respect to said outer sleeve means about said longitudinal axis as said inner and outer sleeve means slide with respect to each other, whereupon said coupling enables said conduits to freely move longitudinally with respect to each other in response to changes in the environment in which said conduits are located without resulting in the disconnection of said conduits from each other.

5. The coupling of claim 4 wherein said second free end of said inner sleeve means has a square outer profile, and wherein said second free end of said outer sleeve means has a square inner profile.

6. The coupling of claim 5 wherein said first free end of said inner sleeve means and said outer sleeve means each has a circular outer profile.

7. An expansion coupling having a longitudinal axis and arranged for slidably connecting the ends of a pair of first and second conduits along said axis, each of said conduits being a tubular member having an outside threaded leading end and an outside threaded trailing end, said coupling comprising inner sleeve means and outer sleeve means, said inner sleeve means being a tubular member having a first end in the form of an internally threaded throat adapted to threadedly receive the trailing end of said first conduit, said inner sleeve means being bisected horizontally to comprise a lower section and an upper section which are arranged to be secured to each other, said outer sleeve means being a tubular member having a first end in the form of an internally threaded throat adapted to threadedly receive the leading end of said second conduit, said outer sleeve means being bisected horizontally to comprise a lower section and an upper section which are arranged to be secured to each other, said coupling additionally comprising first clamp means for securing said upper section of said inner sleeve means to said lower section thereof and second clamp means for securing said upper section of said outer sleeve means to said lower section thereof, said inner sleeve means having a free end in the form of a second end of a predetermined shaped outer periphery having at least one first predetermined shaped surface, said outer sleeve means having a free end in the form of a second end having an opening corresponding in shape to the outer periphery of the free end of said inner sleeve, said second end of said inner sleeve means being arranged for disposition within said second end of said outer sleeve means and with said first and second surfaces contiguous with each other, said inner and outer sleeve means once so disposed being arranged to readily and freely slide with respect to each other along said longitudinal axis, with said first and second surfaces being contiguous to prevent the rotation of said inner sleeve means with respect to said outer sleeve means about said longitudinal axis as said inner and outer sleeve means slide with respect to each other, whereupon said coupling enables said conduits to freely move longitudinally with respect to each other in response to changes in the environment in which said conduits are located without resulting in the disconnection of said conduits from each other.

8. The coupling of claim 5 wherein said second free end of said inner sleeve means has a square outer profile, and wherein said second free end of said outer sleeve means has a square inner profile.

9. The coupling of claim 8 wherein said first free end of said inner sleeve means and said outer sleeve means each has a circular outer profile.

10. A method for slidably connecting the ends of a pair of first and second conduits by means of an expansion coupling, each of said conduits being a tubular member having an outside threaded leading end and an outside threaded trailing end, said coupling comprising inner sleeve means and outer sleeve means, said inner sleeve means having a central longitudinal axis and being a tubular member terminating in a first free end and a second free end, said first free end being in the form of an internally threaded throat, said outer sleeve means having a central longitudinal axis and being a tubular member terminating in a first free end and a second free end, said first free end being in the form of an internally threaded throat, said inner sleeve means being of a first predetermined constant shaped outer profile along a substantial length thereof up to and including said second free end of said inner sleeve means, said first predetermined constant shaped outer profile having at least one first predetermined shaped surface, said outer sleeve means being of a second predetermined constant shaped inner profile along a substantial length thereof up to and including said second free end of said outer sleeve means, said second predetermined constant shaped inner profile corresponding in shape to said first predetermined constant shaped outer profile and having at least one second predetermined shaped surface, said method comprising the steps of inserting said trailing end of said first conduit into threaded engagement with said throat of said inner sleeve means, inserting said leading end of said second conduit into threaded engagement with said throat of said outer sleeve means, inserting said second end of said inner sleeve means through said opening to a position within said second end of said outer sleeve means so that the respective central longitudinal axes of said sleeves are aligned, and with their respective first and second predetermined constant shaped surfaces contiguous with each other so that said inner and outer sleeve means may freely slide along said aligned central longitudinal axes with respect to each other, but with said first and second contiguous surfaces preventing the rotation of said inner sleeve means with respect to said outer sleeve means about said aligned central longitudinal axes, whereupon said coupling enables said conduits to freely move longitudinally with respect to each other in response to changes in the environment in which said conduits are located without resulting in the disconnection of said conduits from each other.

11. A method for slidably connecting the ends of a pair of first and second conduits carrying a cable extending therethrough by means of an expansion coupling and without having to disconnect said cable, each of said conduits being a tubular member having an outside threaded leading end and an outside threaded trailing end, said coupling comprising inner sleeve means and outer sleeve means, said inner sleeve means having a central longitudinal axis and being a tubular member having a first end in the form of an internally threaded throat, said outer sleeve means having a central longitudinal axis and being a tubular member having a first end in the form of an internally threaded throat, said inner sleeve means having a second end of a predetermined shaped outer periphery having at least one first predetermined shaped surface, said outer sleeve means having a second end of a predetermined shaped inner periphery having at least one second predetermined shaped surface, said inner sleeve means being bisected horizontally to comprise a lower section and an upper section, said outer sleeve means also being bisected horizontally to comprise a lower section and an upper section, said method comprising disposing said trailing end of said first conduit onto the portion of the throat of the lower section of said inner sleeve means so that the threads thereof are in engagement with each other, disposing said upper section of said inner sleeve means over said lower section thereof so that the portion of the throat of said upper section is disposed over said trailing end of said first conduit with the threads thereof in engagement with each other, disposing said second end portion of said lower section of said inner sleeve means within said second end portion of said lower section of said outer sleeve means, disposing said leading end of said second conduit onto the portion of the throat of the lower section of said outer sleeve means so that the threads thereof are in engagement with each other, disposing said upper section of said outer sleeve means over said lower section thereof so that the second end portion of the upper section of the inner sleeve means is disposed within the second end portion of the upper section of the outer sleeve means and so that the portion of the throat of said upper section of said outer sleeve means is disposed over said leading end of said first conduit and with the threads thereof in engagement with each other, whereupon the respective central longitudinal axes of said first and second sleeve means are axially aligned, and wherein the respective first and second surfaces of said inner sleeve means and said outer sleeve means are contiguous with each other so that said inner and outer sleeve means may freely slide along said aligned longitudinal axes with respect to each other, but with said contiguous first and second surfaces preventing the rotation of said inner sleeve means with respect to said outer sleeve means about said aligned longitudinal axes, and securing said upper and lower sections of said inner sleeve together and securing said lower and upper sections of said outer sleeve together.

12. The method of claim 11 wherein said upper and lower sections of said inner and outer sleeve means are releasably secured together.

13. The method of claim 12 wherein said releasable securement is accomplished with clamp means.

14. The method of claim 11 wherein said conduits are initially connected by another expansion joint coupling, and wherein said method comprises initially removing said other expansion joint coupling from said conduits without disconnecting said cable extending therethrough so as to ready said conduits for connection by said expansion coupling.

15. The method of claim 14 wherein said upper and lower sections of said inner and outer sleeve means are releasably secured together.

16. The method of claim 15 wherein said releasable securement is accomplished with clamp means.

17. The method of claim 14 wherein said other coupling is removed by cutting it away.

* * * * *